United States Patent [19]
Awasaka et al.

[11] Patent Number: 5,402,642
[45] Date of Patent: Apr. 4, 1995

[54] EXHAUST EMISSION CONTROL DEVICE FOR INTERNAL COMBUSTION ENGINE

[75] Inventors: Moriyoshi Awasaka; Noriyuki Abe; Akira Nagao; Toshiyuki Nishida, all of Saitama, Japan

[73] Assignee: Honda Giken Kogyo Kabushiki Kaisha, Tokyo, Japan

[21] Appl. No.: 112,404

[22] Filed: Aug. 26, 1993

[30] Foreign Application Priority Data

Aug. 26, 1992 [JP] Japan ............... 4-060093 U

[51] Int. Cl.$^6$ ................................ F01N 3/20
[52] U.S. Cl. .................... 60/300; 60/303; 60/320
[58] Field of Search ............ 60/300, 274, 303, 320

[56] References Cited

U.S. PATENT DOCUMENTS 5,140,813 8/1992 Wittenberger ............... 60/300
5,234,668 10/1993 Harada .......................... 60/300

FOREIGN PATENT DOCUMENTS 2333092 1/1975 Germany ............... 60/300
5-133222 5/1993 Japan ..................... 60/300

*Primary Examiner*—Ira S. Lazarus
*Assistant Examiner*—Daniel J. O'Connor
*Attorney, Agent, or Firm*—Lyon & Lyon

[57] ABSTRACT

An exhaust emission control device for an internal combustion engine is provided with a main catalyst activated with heat of exhaust gas, a self-exothermic type auxiliary catalyst activated with electric current energy and a silencer, which are connected in series and in sequence from an upstream side to a downstream side in an exhaust system leading from an engine body. Thus, noxious components included in the exhaust gas can be converted and the gas is purified by using the main and auxiliary catalysts in combination but with the auxiliary catalyst being subject to less heat from the exhaust gas than the main catalyst.

7 Claims, 1 Drawing Sheet

EXHAUST EMISSION CONTROL DEVICE FOR INTERNAL COMBUSTION ENGINE

BACKGROUND OF THE INVENTION

1. Field of the Invention

The present invention relates to an exhaust emission control device for an internal combustion engine, which oxidizes and reduces noxious components such as Nox, CO and the like in exhaust gas by a catalyst connected to an exhaust system in an engine body.

2. Description of the Prior Art

There is a conventionally known exhaust emission control device, as shown in FIG. 3. Such a prior art device uses, in combination, a main catalyst activated with heat from exhaust gas, and an auxiliary or sub catalyst activated with heat supplied by an electric current.

In such an exhaust emission control device, a self-exothermic type auxiliary catalyst 07 activated with heat supplied by an electric current, a main catalyst 06 activated with the heat from exhaust gas and a silencer 05 are connected in sequence from an upstream side to a downstream side in an exhaust system Ex' leading from an exhaust port in an engine body 01.

In order to activate, at an early stage, the conventional main catalyst which is to be activated with heat from exhaust gas, it is necessary to dispose the catalyst in the vicinity of the engine body, so that it may be exposed to the heat or hot exhaust gas. On the other hand, the self-exothermic type catalyst activated by electric current energy supplied from the outside is capable of being maintained at an activating temperature without relying on the hot exhaust gas. Therefore, if the self-exothermic type catalyst is disposed on the upstream side in the exhaust system in the vicinity of the engine body, as in the above prior art device, it is subjected to the heat of the hot exhaust gas and thus early thermal deterioration to lose its intended function as a catalyst whereby, as a result, it acts as a mere heater.

SUMMARY OF THE INVENTION

Accordingly, it is an object of the present invention to provide a novel exhaust emission control device for an internal combustion engine, wherein the exhaust emission control effect is further enhanced by a combination of a usual or essential catalyst and a self-exothermic type catalyst, while inhibiting any thermal deterioration of the self-exothermic type catalyst.

To achieve the above object, according to the present invention, there is provided an exhaust emission control device for an internal combustion engine, comprising a main catalyst activated with heat from exhaust gas, a self-exothermic type auxiliary catalyst activated with heat supplied by an electric current and a silencer, in which these main and auxiliary catalysts and the silencer are connected in series and in sequence from an upstream side to a downstream side in an exhaust system which leads from an engine body.

With the above construction, the main catalyst can be activated early with the heat of hot exhaust gas to enhance its conversion function. On the other hand, the auxiliary catalyst can be maintained at an activating temperature, while any thermal deterioration thereof due to the heat of the exhaust gas is inhibited to the best possible extent. In addition, as a result of the early activation of the main catalyst, the time of supply of electric current to the auxiliary catalyst can be shortened to contribute to a reduction in power consumption. Therefore, it is possible to efficiently perform an exhaust emission control by using the main and auxiliary catalysts in combination.

In addition, to achieve the above object, according to an embodiment of the present invention, the main catalyst comprises first and second main catalysts which are connected in series and in sequence from the upstream side to the downstream side in the exhaust system.

With the above construction, a further early activation of the main catalyst, particularly, the first main catalyst disposed in the vicinity of the engine body is achieved, thereby making it possible to shorten further the time of current supply to the auxiliary catalyst, leading to a further reduction in power consumption.

The above and other objects, features and advantages of the invention will become apparent from the following description of preferred embodiments, taken in conjunction with the accompanying drawings.

DESCRIPTION OF THE PREFERRED EMBODIMENTS

The present invention will now be described by way of preferred embodiments in connection with the accompanying drawings.

Figure 1:
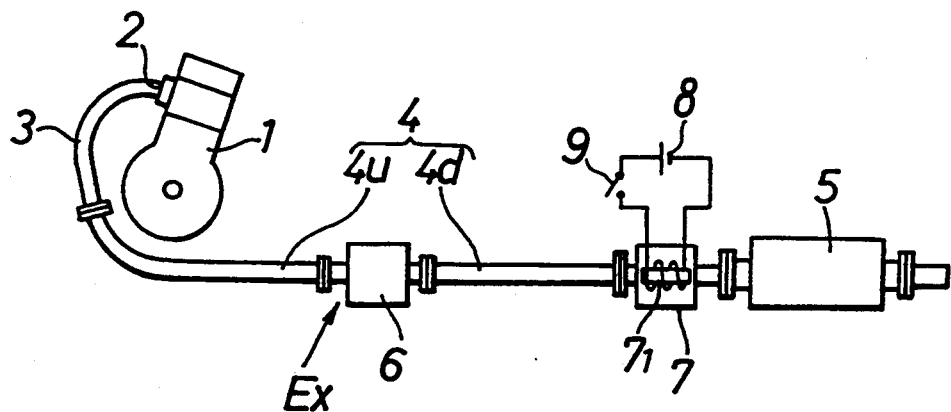
FIG. 1 is a side view of the entire construction of an exhaust emission control device according to a first embodiment of the present invention.

Referring to FIG. 1, an exhaust system Ex for releasing exhaust gas discharged from an engine body 1 to the atmosphere is connected to an exhaust port 2 in the engine body 1. The exhaust system Ex includes an exhaust manifold 3 connected to the exhaust port 2, an exhaust pipe 4 connected to a downstream end of the exhaust manifold 3, and a silencer 5 connected to a downstream end of the exhaust pipe 4.

The exhaust pipe 4 includes an upstream exhaust pipe section $4u$ and a downstream exhaust pipe section $4d$. A conventional main catalyst 6 is connected between the exhaust pipe section $4u$ and $4d$. The main catalyst 6 is activated with heat from hot exhaust gas. Further, a self-exothermic type catalyst 7 (EHC) serving as an auxiliary catalyst is connected between a downstream end of the downstream exhaust pipe section $4d$ and an upstream end of the silencer 5, and is activated with heat supplied by electric energy. The self-exothermic type auxiliary catalyst 7 is formed of a metal carrier $7_1$, which is coated and bonded with an active material by means of a binder. The metal carrier $7_1$ is connected through a switch 9 to a battery 8. When the switch 9 is closed, the metal carrier $7_1$ is directly heated and activated by the electric current. Only when the temperature of the exhaust gas is low as at the start of an engine and thus the main catalyst 6 is still not activated, is the switch 9 turned ON and the auxiliary catalyst 7 is heated by electric current.

The operation of the first embodiment now will be described. When the engine body 1 is operated, the exhaust gas flows from the exhaust port 2 through the exhaust system Ex and is released to the atmosphere. More specifically, the exhaust gas flows through the exhaust manifold 3 and the upstream exhaust pipe section 4u into the main catalyst 6, where it is primarily purified. Then, the exhaust gas flows into the downstream exhaust pipe section 4d into the auxiliary catalyst 7, where it is secondarily purified, and it then flows through the silencer 5 and is released to the atmosphere.

The auxiliary catalyst 7 is heated and sufficiently activated by the electric current from the battery 8, even when the temperature of the exhaust gas is still low as at the start of the engine body 1. Therefore, even when the main catalyst 6 is in its unactivated state and hence, even before it exhibits its converting function, the exhaust gas containing a large amount of unburned components can effectively be purified. If the main catalyst 6 has been brought to a heated activated state by a continued operation of the engine body 1, the supply of the current to the auxiliary catalyst 7 is cut-off, so that the main catalyst 6 functions as a conventional or essential catalyst. The main catalyst 6 is located upstream in the exhaust system Ex and exposed to the hot exhaust gas, so that it is activated relatively early. Therefore, it is possible to shorten the time of current supply to the auxiliary catalyst 7, as compared with the above-described prior art. The auxiliary catalyst 7 is located downstream in the exhaust system Ex, so that the exhaust gas flowing into the auxiliary catalyst 7 has a lowered temperature, as compared with the prior art. Therefore, any thermal deterioration of the auxiliary catalyst 7 is inhibited as much as possible and hence, the auxiliary catalyst 7 can exhibit its intended converting function over a long period of time.

Figure 2:
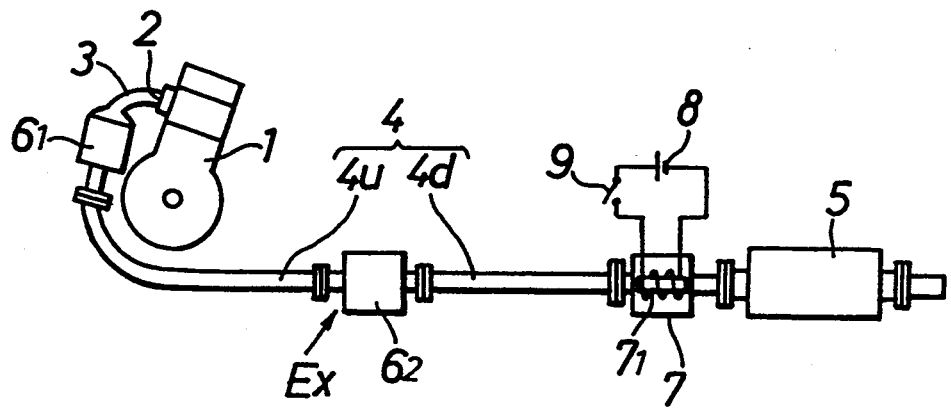
FIG. 2 is a side view of the entire construction of an exhaust emission control device according to a second embodiment of the invention.
Figure 3:
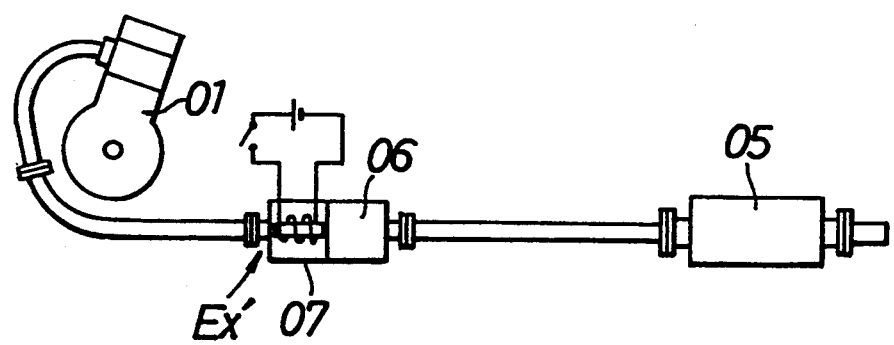
FIG. 3 is a side view of the entire construction of a conventional exhaust emission control device for an internal combustion engine.

A second embodiment of the present invention will now be described in connection with FIG. 2. In this embodiment a first main catalyst $6_1$ and a second main catalyst $6_2$ are used in place of the main catalyst 6 of the previous first embodiment. The first main catalyst $6_1$ is connected between the downstream end of the exhaust manifold 3 and the upstream end of the upstream exhaust pipe section 4u. The second main catalyst $6_2$ is connected between the downstream end of the upstream exhaust pipe section 4u and the upstream end of the downstream exhaust pipe section 4d.

The structure of mounting the auxiliary catalyst 7 and the silencer 5 to the downstream exhaust pipe section 4d is the same as in the first embodiment, whereby they will not be described again at this point.

The operation of the second embodiment now will be described. When the engine is operated, the exhaust gas flows through the exhaust manifold 3 into the first main catalyst $6_1$ and further through the upstream exhaust pipe section 4u into the second main catalyst $6_2$, so that it is primarily purified stepwise by both the main catalysts $6_1$ and $6_2$. Then, the exhaust gas flows through the downstream exhaust pipe section 4d into the auxiliary catalyst 7, where it is secondarily purified, and then flows through the silencer 5 and is released to the atmosphere.

Also in the second embodiment, the first and second main catalysts $6_1$ and $6_2$ are located upstream in the exhaust system Ex and sequentially exposed to the hot exhaust gas, so that an activating energy is applied to the first and second main catalysts $6_1$ and $6_2$ at an early stage. Specifically, the first main catalyst $6_2$ is located in the vicinity of the engine body 1 and therefore is activated very early, thereby making it possible to further shorten the time of current supply to the auxiliary catalyst 7 and to reduce the electric power consumed in the auxiliary catalyst 7.

Although two embodiments of the present invention have been described, it will be understood that the present invention is not limited to these embodiments, and various other embodiments and modifications can be made within the scope of the invention. For example, the engine body may be either of a multi-cylinder type or a single cylinder type, and the main and auxiliary catalysts may be those conventionally known.

What is claimed is:

1. An exhaust emission control device for an internal combustion engine, comprising an exhaust manifold, a main catalyst device activated with heat from exhaust gas, an exhaust pipe section, a self-exothermic type auxiliary catalyst device activated with electric current, and a silencer, said exhaust manifold, said main catalyst device, said exhaust pipe section, said auxiliary catalyst device, and said silencer being connected in series and in sequence from an upstream side to a downstream side in an exhaust system which leads from an engine body.

2. An exhaust emission control device according to claim 1, wherein said main catalyst device comprises first and second main catalysts which are connected in series and in sequence from the upstream side to the downstream side in said exhaust system.

3. An exhaust emission control device according to claim 2, wherein said first main catalyst is inserted between said exhaust manifold and a second exhaust pipe section, and said second main catalyst is inserted between said second exhaust pipe section and said first exhaust pipe section.

4. An exhaust emission control device according to claim 1 wherein said exhaust manifold, said main catalyst device and said exhaust pipe section provide a substantial distance for exhaust gas to travel from the engine body to said auxiliary catalyst device for substantially cooling the exhaust gas before reaching said auxiliary catalyst device.

5. An exhaust emission control device for an internal combustion engine having an exhaust system with an exhaust manifold connecting the engine body to an exhaust gas activated main catalyst device located upstream of a silencer device, an improvement comprising, an auxiliary catalyst device having means for being activated by an electric current, said auxiliary catalyst device being located in the exhaust system downstream of the main catalyst device and upstream of the silencer device an exhaust pipe section extending between said main catalyst device and said auxiliary catalyst device.

6. An exhaust emission control device according to claim 3, wherein said auxiliary catalyst device is located between said main catalyst device and said silencer device.

7. An exhaust emission control device according to claim 5 wherein said exhaust manifold, said main catalyst device and said exhaust pipe section provide a substantial distance for exhaust gas to travel from the engine body to said auxiliary catalyst device for substantially cooling the exhaust gas before reaching said auxiliary catalyst device.

* * * * *